US009547485B2

(12) United States Patent
Suzuki et al.

(10) Patent No.: US 9,547,485 B2
(45) Date of Patent: Jan. 17, 2017

(54) SYSTEM AND METHOD FOR DEPLOYING A VIRTUAL MACHINE

(75) Inventors: Aaron T. Suzuki, Mercer Island, WA (US); Nathan Stanley Johnson, Issaquah, WA (US); Jonathan Gillette, Sandy, UT (US); David Noyes Jeppesen, Mercer Island, WA (US)

(73) Assignee: Prowess Consulting, LLC, Seattle, WA (US)

( * ) Notice: Subject to any disclaimer, the term of this patent is extended or adjusted under 35 U.S.C. 154(b) by 1646 days.

(21) Appl. No.: 11/557,126

(22) Filed: Nov. 7, 2006

(65) Prior Publication Data
US 2007/0234302 A1  Oct. 4, 2007

Related U.S. Application Data

(60) Provisional application No. 60/744,055, filed on Mar. 31, 2006.

(51) Int. Cl.
| G06F 9/46 | (2006.01) |
| G06F 9/445 | (2006.01) |
| G06F 9/455 | (2006.01) |
| G06F 9/50 | (2006.01) |

(52) U.S. Cl.
CPC ............ *G06F 8/61* (2013.01); *G06F 9/45558* (2013.01); *G06F 9/44505* (2013.01); *G06F 9/50* (2013.01); *G06F 9/5077* (2013.01); *G06F 2009/45562* (2013.01); *G06F 2009/45575* (2013.01)

(58) Field of Classification Search
CPC ............. G06F 2009/4557; G06F 2009/45575; G06F 2009/45562
See application file for complete search history.

(56) References Cited

U.S. PATENT DOCUMENTS

| 5,613,002 | A | 3/1997 | Kephart et al. |
| 5,745,669 | A | 4/1998 | Hugard et al. |
| 5,822,517 | A | 10/1998 | Dotan |
| 5,951,639 | A * | 9/1999 | MacInnis ................ A63F 13/12 |
| | | | 348/E5.006 |
| 6,108,697 | A | 8/2000 | Raymond et al. |
| 6,122,629 | A | 9/2000 | Walker et al. |
| 6,240,530 | B1 | 5/2001 | Togawa |
| 6,289,512 | B1 * | 9/2001 | Edwards et al. ............... 717/178 |
| 6,330,648 | B1 | 12/2001 | Wambach et al. |
| 6,397,242 | B1 | 5/2002 | Devine et al. |
| 6,496,847 | B1 | 12/2002 | Bugnion et al. |
| 6,536,035 | B1 * | 3/2003 | Hawkins ...................... 717/100 |

(Continued)

OTHER PUBLICATIONS

USPTO Communication mailed Jun. 8, 2009 in U.S. Appl. No. 11/836,552; 12 pages.

(Continued)

*Primary Examiner* — Abdullah Al Kawsar
*Assistant Examiner* — Caroline H Arcos
(74) *Attorney, Agent, or Firm* — Pepper Hamilton LLP

(57) ABSTRACT

A system and method may include identifying a virtual machine setting associated with a virtual machine, obtaining system specification information associated with a computer, and generating validation information based on the system specification information and the virtual machine setting. The system and method may further include determining whether to deploy the virtual machine to the computer based on the validation information.

26 Claims, 12 Drawing Sheets

(56) References Cited

U.S. PATENT DOCUMENTS

| | | | |
|---|---|---|---|
| 6,636,876 B1 | 10/2003 | Ishihara et al. | |
| 6,704,925 B1 | 3/2004 | Bugnion | |
| 6,711,672 B1 | 3/2004 | Agesen | |
| 6,725,289 B1 | 4/2004 | Waldspurger et al. | |
| 6,735,601 B1 | 5/2004 | Subrahmanyam | |
| 6,785,886 B1 | 8/2004 | Lim et al. | |
| 6,789,156 B1 | 9/2004 | Waldspurger | |
| 6,795,966 B1 | 9/2004 | Lim et al. | |
| 6,802,054 B2* | 10/2004 | Faraj | 717/128 |
| 6,816,963 B1 | 11/2004 | Krithivas et al. | |
| 6,912,631 B1 | 6/2005 | Kekre et al. | |
| 6,961,941 B1 | 11/2005 | Nelson et al. | |
| 6,968,350 B2 | 11/2005 | Traut et al. | |
| 7,017,144 B2 | 3/2006 | Cohen et al. | |
| 7,039,830 B2 | 5/2006 | Qin | |
| 7,334,099 B2 | 2/2008 | Witt et al. | |
| 7,343,600 B2 | 3/2008 | Caliendo et al. | |
| 7,356,679 B1 | 4/2008 | Le et al. | |
| 7,409,719 B2* | 8/2008 | Armstrong et al. | 726/24 |
| 7,437,764 B1 | 10/2008 | Sobel et al. | |
| 7,506,265 B1* | 3/2009 | Traut | G06F 9/4443 715/763 |
| 7,512,977 B2 | 3/2009 | Cook et al. | |
| 7,536,541 B2* | 5/2009 | Isaacson | G06F 9/441 713/1 |
| 7,577,722 B1* | 8/2009 | Khandekar et al. | 709/220 |
| 7,584,349 B2 | 9/2009 | Sedlack | |
| 7,603,440 B1 | 10/2009 | Grabowski et al. | |
| 7,624,443 B2 | 11/2009 | Kramer et al. | |
| 7,668,974 B2 | 2/2010 | Raghunath et al. | |
| 7,716,743 B2 | 5/2010 | Costea et al. | |
| 7,721,284 B2 | 5/2010 | Bykov et al. | |
| 7,721,285 B2* | 5/2010 | Imada et al. | 718/1 |
| 7,774,191 B2* | 8/2010 | Berkowitz et al. | 703/23 |
| 7,836,337 B1* | 11/2010 | Wu et al. | 714/15 |
| 7,913,044 B1 | 3/2011 | Desai et al. | |
| 7,953,980 B2 | 5/2011 | Schluessler et al. | |
| 7,984,304 B1 | 7/2011 | Waldspurger et al. | |
| 8,166,475 B1* | 4/2012 | Scales et al. | 718/1 |
| 8,359,596 B2* | 1/2013 | Kobayashi et al. | 718/102 |
| 8,464,250 B1* | 6/2013 | Ansel | 718/1 |
| 2002/0174137 A1 | 11/2002 | Wolff et al. | |
| 2003/0028628 A1 | 2/2003 | Irwin et al. | |
| 2003/0167331 A1 | 9/2003 | Kumar et al. | |
| 2003/0187883 A1 | 10/2003 | Zelenka et al. | |
| 2004/0039926 A1* | 2/2004 | Lambert | 713/189 |
| 2004/0044721 A1 | 3/2004 | Song et al. | |
| 2004/0107199 A1 | 6/2004 | Dalrymple et al. | |
| 2005/0044301 A1* | 2/2005 | Vasilevsky et al. | 711/1 |
| 2005/0071442 A1* | 3/2005 | Becker et al. | 709/220 |
| 2005/0120063 A1 | 6/2005 | Koestler | |
| 2005/0125513 A1* | 6/2005 | Sin-Ling Lam et al. | 709/220 |
| 2005/0193245 A1 | 9/2005 | Hayden et al. | |
| 2005/0198487 A1* | 9/2005 | Zimmer et al. | 713/2 |
| 2005/0198629 A1 | 9/2005 | Vishwanath | |
| 2005/0268336 A1* | 12/2005 | Finnegan | G06F 21/31 726/15 |
| 2006/0031940 A1 | 2/2006 | Rozman et al. | |
| 2006/0041883 A1 | 2/2006 | Chambers et al. | |
| 2006/0041940 A1 | 2/2006 | Fang | |
| 2006/0137013 A1 | 6/2006 | Lok | |
| 2006/0168576 A1 | 7/2006 | Phung et al. | |
| 2006/0230454 A1 | 10/2006 | Achanta et al. | |
| 2006/0233367 A1 | 10/2006 | Birrell et al. | |
| 2006/0277542 A1* | 12/2006 | Wipfel | 717/174 |
| 2007/0061818 A1 | 3/2007 | Williams et al. | |
| 2007/0078801 A1 | 4/2007 | Guruprakash | |
| 2007/0101342 A1 | 5/2007 | Flegg et al. | |
| 2007/0204266 A1* | 8/2007 | Beaty et al. | 718/1 |
| 2007/0214198 A1 | 9/2007 | Fontenot et al. | |
| 2007/0226341 A1* | 9/2007 | Mateo | 709/226 |
| 2007/0234302 A1 | 10/2007 | Suzuki et al. | |
| 2007/0234337 A1 | 10/2007 | Suzuki et al. | |
| 2007/0234356 A1 | 10/2007 | Martins et al. | |
| 2008/0016564 A1 | 1/2008 | Claudatos et al. | |
| 2008/0077662 A1 | 3/2008 | Zarenin et al. | |
| 2008/0092134 A1 | 4/2008 | Zhang et al. | |
| 2008/0163194 A1 | 7/2008 | Dias et al. | |
| 2008/0244045 A1 | 10/2008 | Fox et al. | |
| 2008/0256532 A1 | 10/2008 | Xie et al. | |
| 2008/0270583 A1 | 10/2008 | Gonzalez et al. | |
| 2008/0278197 A1 | 11/2008 | Murotake et al. | |
| 2009/0043890 A1 | 2/2009 | Noonan | |
| 2009/0198731 A1 | 8/2009 | Noonan | |
| 2009/0282404 A1* | 11/2009 | Khandekar et al. | 718/1 |
| 2010/0030878 A1 | 2/2010 | Grabowski et al. | |
| 2012/0005673 A1 | 1/2012 | Cervantes et al. | |

OTHER PUBLICATIONS

USPTO Communication mailed Feb. 4, 2010 in U.S. Appl. No. 11/836,552; 17 pages.

"Understanding VHD (virtual hard disk) options"—Anil Desai, searchservervirtualization.techtarget.com/tip/1,289483,sid94_gci1193492,00.html, Jun. 16, 2006, 4 pages.

Virtual Hard Disk Image Format Specification—microsoft.com/technet/virtualserver/downloads/vhdspec.mspx, Oct. 10, 2005, 3 pages, microsoft.

Virtual Hard Disk Image Format Specification—microsoft.com/interop/osp/default.mspx, Oct. 11, 2006—Version 1.0, 17 pages, microsoft.

Virtualization Overview, VMware White Paper, vmware.com, 2006, 11 pages.

Virtualization: Architectural Considerations and Other Evaluation Criteria, VMWare, White Paper, vmware.com, 14 pages (2006).

Windows Vista Imaging File Format (WIM)—Mar. 2007 (16 pgs), microsoft.

Vmware, Inc., Virtual Disk Format 1.0, VMware Virtual Disks, VMware Technical Note, 13 pages, Retrieved from the Internet on at: www.vmware.com, Copyright © 1998.

Vmware, Inc., Virtualivation Overview, VMware White Paper, 11 pages (2006).

Vmware, Inc., Virtualization: Architectural Considerations and Other Evaluation Criteria, VMware White Paper, 14 pages (2006).

Microsoft, Windows Vista Imaging File Format (WIM), 16 pages, Mar. 2007.

USPTO Communication mailed Oct. 8, 2014 in U.S. Appl. No. 11/557,687; 24 pages.

USPTO Communication mailed Apr. 6, 2015 in U.S. Appl. No. 11/557,687; 24 pages.

* cited by examiner

600

SYSTEM AND METHOD FOR DEPLOYING A VIRTUAL MACHINE

CROSS REFERENCE TO RELATED APPLICATIONS

This application claims the benefit of U.S. Provisional Application No. 60/744,055, filed Mar. 31, 2006, titled, "A Software Method and a Storage media for Deploying a Virtual Machine," the contents of which are hereby incorporated by reference in their entirety.

FIELD OF THE INVENTION

Exemplary embodiments relate to a virtual machine, and more specifically to deployment of a virtual machine on a computer.

BACKGROUND OF THE INVENTION

The concept of a virtual machine (VM) has been used in computing for decades. Mainframe computers throughout computing history have taken advantage of their computing power by using multiple instances of an operating system on the same computer. Virtual machines are highly desirable due to their ability to isolate specific applications, tasks, or users. For example, an individual wanting to manage their personal finances might use a virtual machine specifically equipped with personal accounting software and a variety of sensitive personal finance data. Virtual machines advantageously can be backed up to prevent data loss due to a computer failure and may prevent others from seeing or exploiting sensitive data.

Driving this functionality into personal computers and single-processor servers was difficult early on due to the large amount of computing system resources (e.g., processor speed, memory, and input/output) required to run multiple operating systems on the same computer. As computing power for small systems has grown, and more sophisticated processor architectures (such as 64-bit processors and multi-core processors) have increased throughput and memory address space, the viability, adoption, and proliferation of virtual machines has grown into the main stream consumer market.

Conventional solutions provided by, for example, VMware®, Microsoft®, and Xen®, generally include a basic user interface. For example, Xen develops an open source Linux player and VMware develops Windows-based and Linux-based virtualization software for personal and server computers. VMware refers to virtual machines as "virtual appliances." VMware has a patented virtual machine monitor and method for operating a virtual machine (U.S. Pat. Nos. 6,397,242 and 6,496,847, respectively), as well as several additional patents that describe specific methods by which virtual machine actions or behavior are accomplished or managed (U.S. Pat. Nos. 6,704,925, 6,711, 672, 6,725,289, 6,735,601, 6,785,886, 6,789,156 and 6,795, 966). U.S. Pat. No. 6,961,941 describes how resources are managed by name. The contents of the aforementioned patents are hereby incorporated by reference in their entireties.

Microsoft increased their virtualization competency through the acquisition of a company called Connectix, whose release of Virtual PC for Mac allowed Apple® users to run Microsoft Windows and its associated applications on a virtual machine. Microsoft has patents protecting various aspects of their virtual machine technology including storage technology (e.g., U.S. Pat. No. 6,968,350). The contents of which are hereby incorporated by reference in its entirety.

Virtual machine use has evolved from very sophisticated computing solutions available mostly to large enterprises, government, and academic institutions down to the mid-market and home users. Because a virtual machine needs all of the same things a physical computer needs (i.e., processor, memory, and input via a keyboard and mouse), the way in which virtual machines are created and configured is quite technical and involved.

Problems, however, exist with deploying virtual machines. Virtual machines are typically stored as a set of files. These files are generally quite large, often 1 giga-byte (GB) and can be more than 100's of GB. These files remain large, even when compressed. While the portability of virtual machines (or the ability of a virtual machine to be easily moved and run from one physical host computer to another) is very attractive, the time to move and load the files can take several hours and require some human monitoring and involvement.

Virtual machines also are technically complex to create and use. Effectively using them often requires more technical knowledge and time than is possessed by the average business professional (information worker) who daily uses computers. Even many technically trained information technology professionals have problems with creating and using virtual machines.

SUMMARY OF THE INVENTION

Exemplary embodiments may include a computer-implemented method and a recordable media for storing instructions implementing the software method.

A computer-implemented method may include identifying a virtual machine setting associated with a virtual machine, obtaining system specification information associated with a computer, and generating validation information based on the system specification information and the virtual machine setting. The method may further include determining whether to deploy the virtual machine to the computer based on the validation information.

A computer program stored on a tangible computer-readable media may include code to identify a virtual machine setting associated with a virtual machine, code to obtain system specification information associated with a computer, and code to generate validation information based on the system specification information and the virtual machine setting. The computer program may further include code to determine whether to deploy the virtual machine to the computer based on the validation information.

A system may include means for identifying a virtual machine setting associated with a virtual machine, means for obtaining system specification information associated with a computer, and means for generating validation information based on the system specification information and the virtual machine setting. The system may further include means for determining whether to deploy the virtual machine to the computer based on the validation information.

A system may include a virtual machine deployment application module to receive a virtual machine setting associated with a virtual machine, and a specification module to obtain system specification information associated with a computer. The system also may include a validation module to generate validation information based on the system specification information and the virtual machine setting and to determine whether to deploy the virtual machine to the computer based on the validation information.

These and other embodiments and advantages will become apparent from the following detailed description, taken in conjunction with the accompanying drawings, illustrating by way of example the principles of the various exemplary embodiments.

DETAILED DESCRIPTION OF EXEMPLARY EMBODIMENTS

Figure 1:
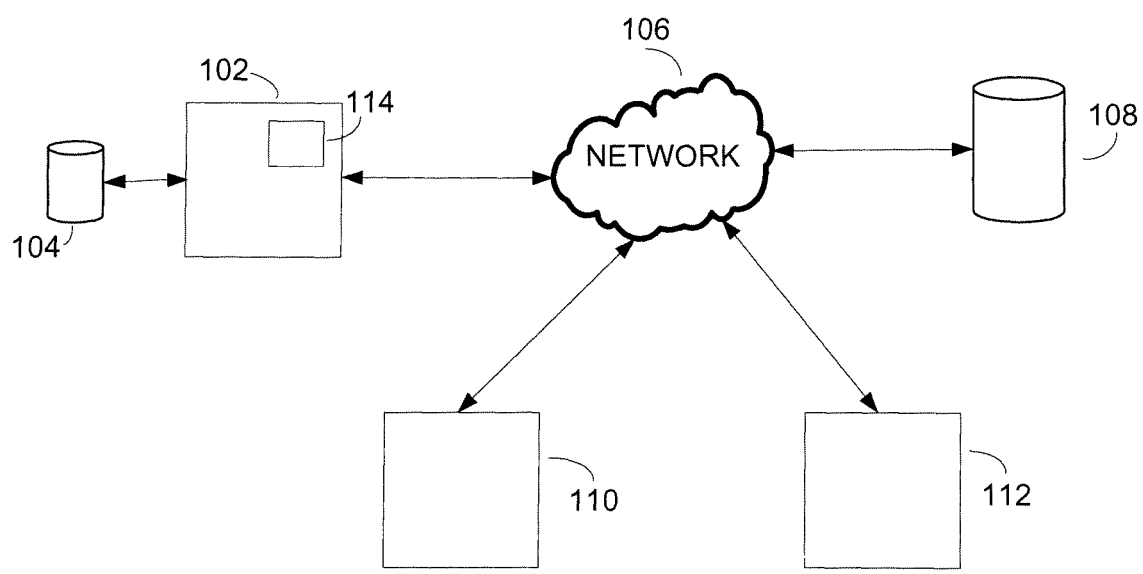
FIG. 1 illustrates an exemplary embodiment of a system for deploying a virtual machine on a host computer.

The following description is intended to convey a thorough understanding of the embodiments described by providing a number of specific embodiments and details involving virtual machine architecture, systems, and methods for deploying and managing virtual machines. It should be appreciated, however, that the embodiments are not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

The description below provides a discussion of servers, computers, and other devices that may include one or more modules. As used herein, the term "module" may be understood to refer to software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices. The systems described herein also may include other devices not shown.

The terminology used herein is for the purpose of describing particular embodiments only and is not intended to limit the scope of the present invention. As used throughout this disclosure, the singular forms "a," "an," and "the" include plural reference unless the context clearly dictates otherwise. Thus, for example, a reference to "a host computer" includes a plurality of such host computers, as well as a single host computer, and a reference to "an interface" is a reference to one or more interfaces and equivalents thereof known to those skilled in the art, and so forth.

Overview

Conventional virtualization software for running a virtual machine (VM) generally does not make any assumptions about the state of the VM. The virtualization software only determines whether there is a container (e.g., a virtual hard disk), and whether the host machine meets certain specifications (e.g. memory and other hardware resource allocation). Conventional virtualization software relies on the user to perform all of the configuration, deployment, host system settings, and computing resource allocation necessary to run the VM.

The exemplary embodiments overcome problems of conventional solutions. Conventional user interfaces of virtual machines do not easily allow non-technical users to automate functions that they may use repeatedly when deploying virtual machines. Nor do conventional solutions allow virtual machines to be organized into groups for controlling the group. Conventional solutions do not address the need of users to easily acquire, install, and configure virtual machines. Furthermore, the user interfaces associated with conventional virtual machines do not automate the use of distributed virtual machines.

The exemplary embodiments may permit easier deployment and use of virtual machines for users of all ability levels as compared with conventional solutions. The exemplary embodiments also may permit use of virtual machines for learning, evaluation, and execution of business applications. Additionally, the exemplary embodiments may provide an accelerated, unattended setup and deployment process for pre-built virtual machines, thus saving considerable time and hassle.

Exemplary embodiments may perform various functions. A VM module may deploy virtual machines in a manner that is transparent to the end user and substantially free of end-user direction. To this end, in an exemplary embodiment, the VM module may permit a user to deploy a virtual machine with a single user action (such as, but not limited to, a key stroke or mouse click) if the host computer and user satisfy a certain set of basic VM settings, for example. The VM module may provide premium functionality currently not available in conventional solutions. The VM module may use a standard, predefined set of VM settings, based upon a VM payload, to guide users from installation of the VM (e.g., the receipt of storage media or attachment of storage devices containing the VM and deployment of the VM on a host computer) through operation of the VM.

Additionally, the VM module may discover all of the virtual machines available to an end user at the host computer, regardless of the storage medium on which the virtual machines may reside or the format of the virtual machine files. The VM module may uniquely identify and catalog virtual machines associated with a computer for managing and organizing individual VMs into logical VM groups (e.g., a virtual infrastructure). The exemplary embodiments of the VM module may collect and use all information necessary to deploy, configure, and run one or more virtual machines on a host computer.

System Architecture

FIG. 1 illustrates an exemplary embodiment of a system 100 for deploying a virtual machine (VM) on a host computer 102. The system 100 may include a host computer 102, a local storage device 104, a network 106, a remote storage device 108, a remote computer 110, and a VM update service (VMUS) server 112. The host computer 102 may be a computing device at which a user desires to deploy and use a VM. The host computer 102 may be any device capable of processing one or more programming instructions. For example, the host computer 102 may be a desktop computer, a laptop computer, a notebook computer, a mobile phone, a personal digital assistant (PDA), combinations thereof, and/or other suitable computing devices capable of running a VM. The host computer 102 may include a VM module 114 for deploying and running a VM from a computer readable storage media received at the local storage device 104.

The local storage device 104 may be external to the host computer 102, as depicted, or may be internal to the host computer 102. The local storage device 104 may receive a computer readable storage media, such as, but not limited to, a digital versatile disc (DVD), a compact disc (CD), a ZIP disc, a Flash memory, other media capable of storing a VM payload, and/or combinations thereof. In various exemplary embodiments, the VM payload also may be stored on one or more storage media. Also, the VM payload may be stored as a zipped archive file and/or as an emulated storage medium [.ISO] file on the storage media. Also, part or all of the VM payload may be stored at the remote storage device 108, at the remote computer 110, and/or on other storage devices, and the host computer 102 may retrieve the VM payload over the network 106.

The remote storage device 108 may include a file server or a network access server (NAS) for storing one or more VM payloads and may be accessible via the network 106. For example, the network 106 may be a storage area network (SAN), the World Wide Web, a corporate intranet site, a partner site, combinations thereof, and/or other communication networks. The host computer 102 also may access the VM payload from various combinations of the host computer 102, the local storage device 104, the network 106, the remote storage device 108, the remote computer 110, from other storage locations, and/or combinations thereof.

Figure 2:
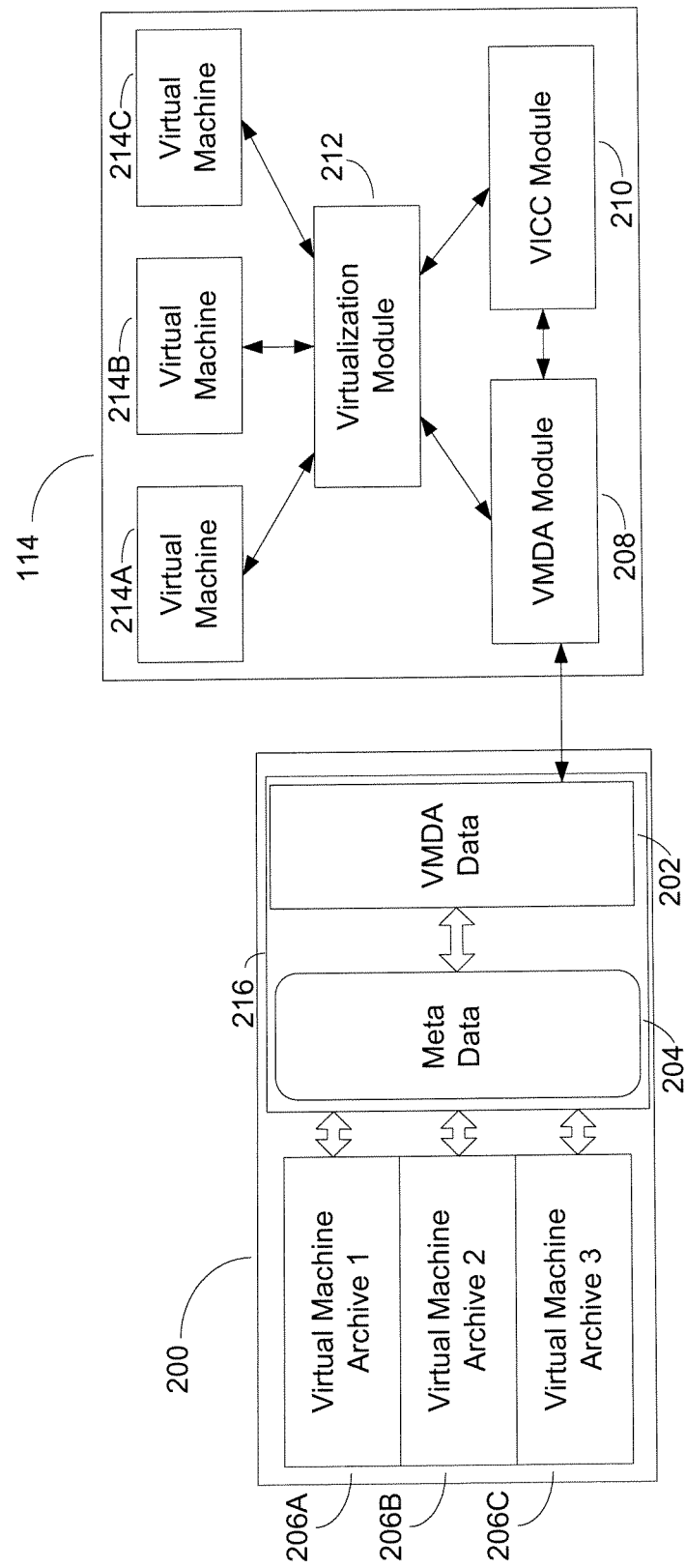
FIG. 2 illustrates an exemplary embodiment of a virtual machine module and a virtual machine payload.

FIG. 2 illustrates an exemplary embodiment of a VM module 114 and a VM payload 200. The VM payload 200 may be stored on the storage media, for example, and may include information useable by the VM module 114 for deploying a VM on the host computer 102. In an exemplary embodiment, the VM payload 200 may include virtual machine deployment application (VMDA) data 202, metadata 204, and one or more virtual machine archives 206A-C. FIG. 2 depicts three virtual machine archives 206A-C; however, any number of virtual machine archives may be stored on the storage medium. Each virtual machine archive 206A-C may be a processed VM stored on the storage media, for example.

The VMDA data 202 and the metadata 204 may define VM settings 216 for the VM archive 206. In various exemplary embodiments, the VM settings 216 may be used by the VMDA module 208 for deploying the VM onto the host computer 102. In a VMDA administrator interface, the VM developers may predefine the VM settings 216 to identify optimal and minimal requirements of the host computer 102 for running the VM. VM developers may refer to individuals, such as computer programmers and hardware designers, who design VMs. The VM settings 216 may provide VM developers a way to present the VM to the user the way in which the VM is designed. The VM settings 216 also may permit the VM developers to prevent deployment of their VM if the host computer 102 is not capable of running the VM as designed. Also, depending upon the implementation, the VM settings 216 may permit the user to deploy a VM on a substandard computer system, and may instruct the host computer 102 to display a warning regarding possible substandard performance of the VM. For example, the host computer 102 may be a substandard computer if it does not satisfy one or more of the optimal and/or minimal requirements specified in the VM settings 216, as will be discussed below in further detail. The following describes various VM settings 216 that the VM developer may predefine related to the deployment and optimal use of the VM. Each of the VM settings 216 may be used individually, and/or in various combinations, when deploying the VM on the host computer 102.

In various exemplary embodiments, the VM settings 216 may specify, for example, a processor setting, a minimum system memory setting, a free disk space setting, a networking hardware setting, an other peripheral devices setting, a security setting, a presence of a virtualization module setting, a virtual network and sensitivity setting, and/or combinations thereof.

In an embodiment where the VM settings 216 specify a processor setting, the processor setting may define a minimum processor speed for a processor of the host computer 102. The minimum processor speed may refer to a clock speed of the central processing unit (CPU) of the host computer 102. For example, the minimum processor speed for the CPU of the host computer 102 may depend upon the number of other VMs anticipated to simultaneously run on the host computer 102, the operating system used by each VM, the roles played by each VM, and/or other information corresponding to the CPU usage requirements of other programs associated with the host computer 102.

In an embodiment where the VM settings 216 specify a minimum system memory setting, the minimum system memory setting may define a minimum amount of memory (e.g., random access memory (RAM)) for the host computer 102 that may be necessary to properly operate the VM. Like the processor setting, the value for the minimum system memory setting may depend on the number of VMs projected to run at one time, the operating system used by each VM, what each VM is expected to do while running, and/or other information corresponding to the memory usage requirements of other programs associated with the host computer 102.

In an embodiment where the VM settings 216 specify a free disk space setting, the free disk space setting may define an amount of disk space on storage devices accessible to the host computer 102 to ensure, for example, that there is sufficient extra space on the storage devices to accommodate the expected dynamic expansion of data associated with the VM during use of the VM. For example, the storage devices may be a hard disk of the host computer 102, storage space on a network device, other data storage locations, and/or combinations thereof.

In an embodiment where the VM settings 216 specify a network hardware setting, the networking hardware setting may specify that one or more network interface cards (NICs) be present on the host computer 102. In an exemplary embodiment, the VM payload 200 may associate multiple VMs with one another on a local virtual LAN, for example.

In such a case, the networking hardware setting may specify that the host computer 102 has a loop-back adapter to test and configure the multiple VMs before allowing the VMs to be deployed on the host computer 102.

In an embodiment where the VM settings 216 specify an other peripheral devices setting, the other peripheral devices setting may specify that one or more peripheral devices are attached to the host computer 102. For example, the other peripheral devices setting may specify that a Universal Serial Bus (USB)-based smart card reader is attached to the host computer 102 before deploying if a particular VM relies on the smart card reader being attached to the host computer 102. The other peripheral devices setting also may indicate the presence of other peripheral devices, such as, but not limited to, cameras, printers, monitors, input devices, output devices, and/or other suitable peripheral devices.

In an embodiment where the VM settings 216 specify a security setting, the security setting may define a write access setting, a network connectivity setting, a required user rights setting, and/or combinations thereof. In an exemplary embodiment, the write access setting may refer to the privileges associated with the user who is attempting to deploy and run the VM on the host computer 102, as well as the user's privileges to a logical disk of the host computer 102 or other storage devices (e.g., remote storage device 108) on which the VM may reside and run. The write access setting may specify that only users with sufficient privileges to write on the logical disk of the host computer 102 may proceed with the deployment and running of the VM. The write access setting also may ensure that the user has access to adequate space on the logical disk.

In an embodiment where the VM settings 216 specify a network connectivity setting, the network connectivity setting may specify that the host computer 102 has connectivity to the network 106, which may be, for example, but not limited to, a Local Area Network (LAN), Intranet, Internet, Wide Area Network (WAN), wireless network, combinations thereof, and/or other suitable communication networks that may be useable by the VM. The proper network connectivity setting may be used to automatically add virtual networks and to configure the VM to utilize a network interface of the host computer 102 that connects to the network 106.

In an embodiment where the VM settings 216 specify a required user rights setting, the required user rights setting may specify that the user attempting to deploy and run the VM must possess sufficient privileges for other actions necessary to run the VM. For example, the required user rights settings may be used to verify that the user attempting to install a specialized VM can access a SAN on which the VM Archive 206 for the specialized VM are stored.

In an embodiment where the VM settings 216 specify a presence of virtualization module setting, the presence of virtualization module setting may be used to identify the presence of a virtualization module. A virtualization module may include, but is not limited to, Microsoft Virtual Server, Microsoft Virtual PC, VMware Workstation, VMware Server, VMware Player, combinations thereof, and/or other software or devices useable for running the VM. For example, the presence of virtualization module setting may be used to ensure that the host computer 102 attempting to install a VM has the appropriate virtualization module to run the VM. The presence of virtualization module setting also may be used to indicate which virtualization module must be installed (depending upon the licensing structure of the VM) before deploying the VM on the host computer 102. The presence of virtualization module setting also may specify which virtualization module 212 may be used if multiple virtualization modules are on the host computer 102.

In an embodiment where the VM settings 216 specify a virtual network and sensitivity setting, the virtual network and sensitivity setting may specify details of a virtual network for multiple VMs if a particular VM is designed to simultaneously run more than one other VM. The virtual network and sensitivity setting may define the order in which the VMs are started. For example, a second VM, during start up, may use information generated by a first VM. The first VM may be a directory server for a virtual network associated with a second VM and a third VM. The second VM may use the directory server of the first VM to communicate across the virtual network with the third VM. Thus, the first VM may need to be started before starting other VMs.

The virtual network and sensitivity setting also may define the number and nature of network connections for each virtual machine. If a VM requires access to the network 106, it may not be obvious which virtual machine-based network interface is used. The virtual network and sensitivity setting may instruct the host computer 102 to poll all network interfaces to identify connectivity to the network 106 and may instruct that the VM network connection may be automatically associated with the proper network connection of the host computer 102.

The VM module 114 may use one or more of the VM settings 216 for deploying the VM on the host computer 102. In an exemplary embodiment, as shown in FIG. 2, the VM module 114 may include a virtual machine deployment application (VMDA) module 208, a Virtual Infrastructure Catalog Client (VICC) module 210, a virtualization module 212, and one or more VMs 214.

The virtualization module 212 may operate and control the one or more VMs 214A-C already deployed on the host computer 102. For example, the virtualization modules 212 may be one or more of Microsoft Virtual PC, Microsoft Virtual Server, (e.g., Microsoft Virtual Server 2005 (VS05)), VMware Player, VMware Server, VMware Workstation software, and/or other suitable virtualization modules for running a VM. It is noted that FIG. 2 depicts three VMs 214A-C; however, any number of VMs may be associated with the virtualization module 212. Likewise, the VM module 114 may include more than one virtualization module 212, and various VMs 214 may be associated with one or more of the virtualization modules 212. For example, VMs 214A-B may be associated with virtualization module 212, and VM 214C may be associated with a second virtualization module.

Exemplary VICC Architecture

Figure 3:
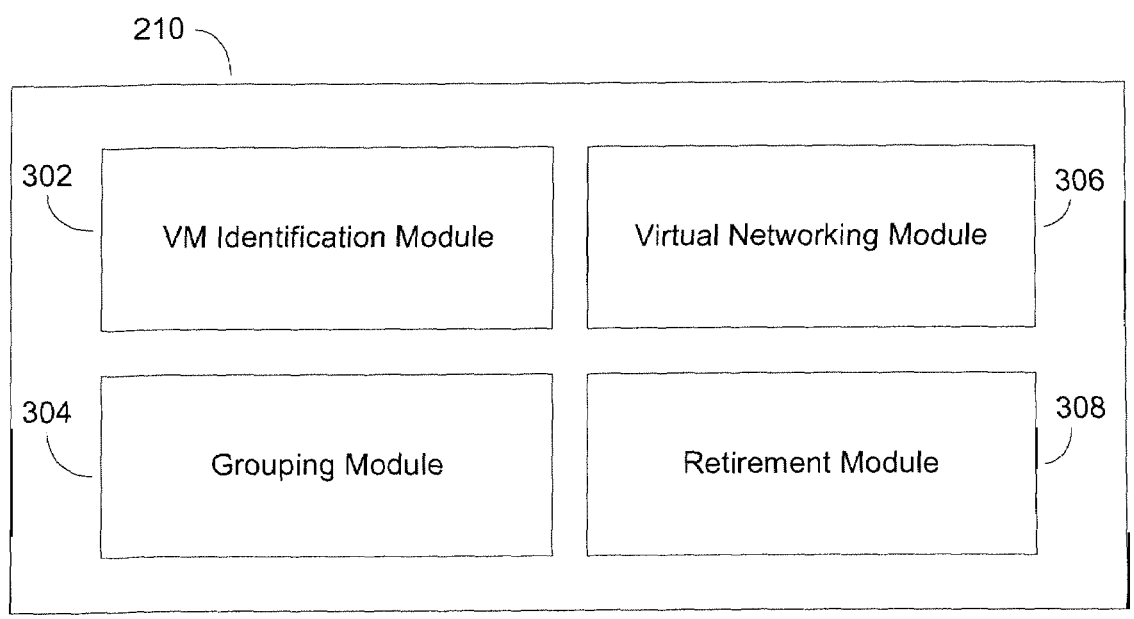
FIG. 3 illustrates exemplary architecture of a Virtual Infrastructure Catalog Client module.

FIG. 3 illustrates exemplary architecture of the VICC module 210. The VICC module 210 may control and manage various VMs deployed on the host computer 102. In an exemplary embodiment, the VICC module 210 may be a desktop application that displays the VMs available to the host computer 102 and may provide functionality to easily manage the VMs. The VICC module 210 also may sort VMs into logical groups and may allow users to create virtual infrastructures based on one or more VMs. The VICC module 210 may provide: automatic discovery of VMs available to the host computer 102; automatic addition of discovered VMs; grouping of virtual machines into virtual infrastructures; virtual networking of VMs within a master catalog; virtual machine retirement; and/or combinations thereof.

In an exemplary embodiment, the VICC module 210 may catalog one or more VMs stored on a hard drive and/or other storage devices associated with the host computer 102. Cataloguing may include including one or more VMs in a list, along with information about the VMs. For example, the list also may include information on virtual networks, associated peripheral devices, and/or other information specified in the VM settings 216 associated with the VM.

When the user installs the VICC module 210 on the host computer 102, the VICC module 210 may comprehensively search to auto-discover all VMs available to the host computer 102 and may create a master catalog of these identified VMs. Auto-discovering may refer to searching for VMs available to the host computer 102, as will be described below in detail. After auto-discovering the VMs, the user may associate individual VMs together into one or more virtual infrastructures (e.g., a set of one or more VMs) using the VICC module 210. The user also may efficiently create multiple versions of the same VM or virtual infrastructure using the VICC module 210. Versioning may refer to a user saving one or more states of a VM. For example, the state of the VM may correspond to data associated with the VM at a particular instance. A user may save an initial version of the VM, and then modify the VM in a new version. Later, the user may return to the initial version of the VM to recover all of the data associated with the initial instance without any of the modifications made to the initial version in the new version. Versioning also may permit the user to restore the data associated with the new version of the VM. Additionally, the VICC module 210 may apply a taxonomy to dynamically generate names associated with versions of virtual infrastructures. For example, the VICC module 210 may generate unique names, such as incremental numbers, for the virtual infrastructures. A user also may rename the unique names of the virtual infrastructures.

In an exemplary embodiment, the VICC module 210 may include a VM identification module 302, a grouping module 304, a virtual networking module 306, and a retirement module 308.

The VM identification module 302 may identify multiple VMs on the host computer 102 that may be controlled by the virtualization module 212. In an exemplary embodiment, the VM identification module 302 may automatically auto-discover VMs by searching the host computer 102 to identify available VMs. The VM identification module 302 also may search for VMs stored at various computer data storage locations including, but not limited to, internal hard drives, attached storage devices, external hard drives, network storage drives, and/or other storage locations associated with the host computer 102. The VM identification module 302 may automatically discover: any VMs residing on the host computer 102; virtual machines stored on a storage medium inserted into the local storage device 104; virtual machines stored on a storage device attached to the host machine 102; virtual machines available across the network 106; virtual machines on a website to which the host computer 102 has access; combinations thereof, and/or other network locations where the host computer 102 may access a VM.

Once the VM identification module 302 has discovered the VMs, the VM identification module 302 may add the discovered VMs to a master catalog of VMs. The master catalog may be a list of the VMs available to the host computer 102 and a network address of the VMs. Automatic addition of discovered virtual machines to the master catalog may permit the VICC module 210 to simplify VM management, for example.

After adding the discovered VMs to the master catalog, the user may group one or more VMs together to create one or more virtual infrastructures, which the user may name.

The grouping module 304 may group one or more VMs into a virtual infrastructure for associating individual VMs with one another. For example, a virtual infrastructure may include one or more VMs that work together. Also, a virtual infrastructure may include VMs that may not work together. Grouping of individual VMs into a virtual infrastructure may allow for easy management of VMs. A virtual infrastructure may permit organizing, grouping, saving, moving, copying, versioning, etc., of multiple VMs as a group. For example, a user interface of the VICC module 210 may display may display the VMs within the virtual infrastructure in an expandable/collapsible menu structure.

Some or all of the VMs within the virtual infrastructure may be controlled as a group and may be assigned various settings controlling the interaction of the VMs within the virtual infrastructure. For example, the assigned settings may specify start-up and shut-down order and timing, virtual network settings, optional membership in the virtual infrastructure, management of disk hierarchy, versioning, combinations thereof, and/or other settings associated with virtual hardware for the individual VMs within the virtual infrastructure. The virtual infrastructure also may be controlled as a group for purposes of retirement, removal, and/or modification of the VMs. Additionally, the VICC module 210 may allow a user to allocate resources (e.g., RAM, network connectivity, etc.) to the virtual infrastructure either individually or as a group. It is noted, however, that even when a VM is part of a virtual infrastructure, the VM may still exist as separate, unique entity which may be used individually or may be added to one or more other virtual infrastructures.

The virtual networking module 306 may virtually network VMs within the master catalog that are grouped into virtual infrastructures. The virtual networking module 306 may assign IP addresses, subnets, gateways, network names, host names, firewall settings, and/or combinations thereof. In an exemplary embodiment, the VMs included in a virtual infrastructure may report their roles to the virtual networking module 306, which may dynamically assign settings appropriate for the virtual infrastructure.

The retirement module 308 may provide for the retirement of individual VMs or virtual infrastructures. VM retirement may permit the VICC module 210 to aid end users and administrators to remotely and/or locally free up resources by retiring VMs. Retirement may permit users and administrators to prevent virtual-machine sprawl caused by VMs that are created and used for a specific purposes, and then forgotten. The retirement module 308 may allow for automated archiving of retired individual VMs or virtual infrastructures. Archiving may refer to processing the VM or virtual infrastructures to free up resources of the host computer 102. In an exemplary embodiment, the retirement module 308 may compress all of the VMs in the virtual infrastructure using data compression, forward the compressed VMs to the remote storage device 108, and delete the compressed VM set from the host computer 102. In archiving, the retirement module 308 also may retain archive information on a retirement location, retirement date, archived size, and/or combinations thereof. The retirement module 308 may use the archive information for automated redeployment of retired VMs or virtual infrastructures to the host computer 102.

Exemplary VICC Process

Figure 4:
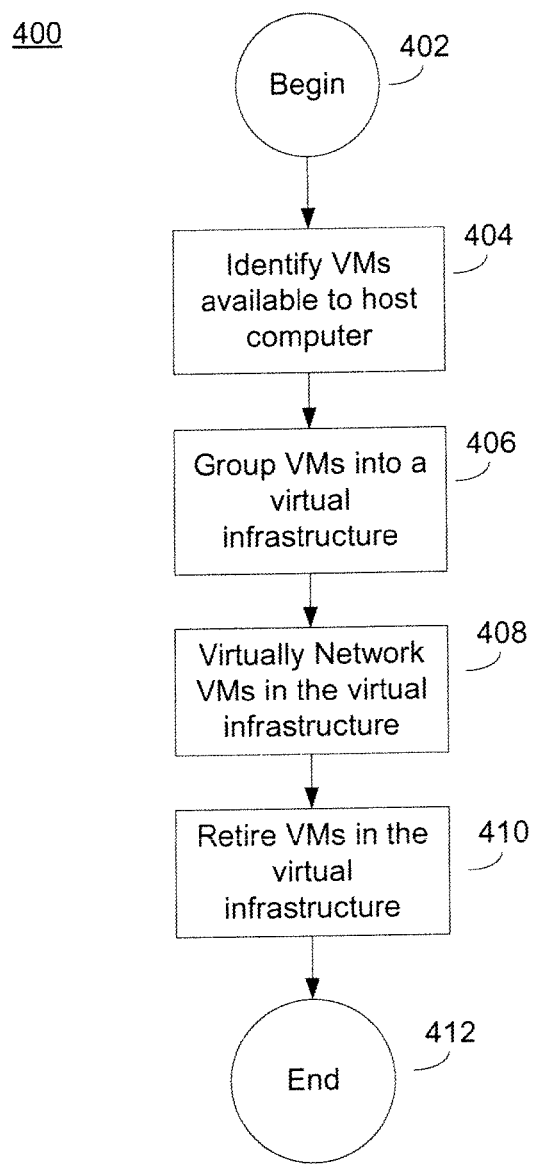
FIG. 4 illustrates an exemplary flow diagram of processes performed by a Virtual Infrastructure Catalog Client module.

FIG. 4 illustrates an exemplary embodiment of a flow diagram of the VICC module 210. The flow diagram 400 may begin at 402 and may continue to 404.

In 404, the VM identification module 302 may identify VMs available to the host computer 102 and may include the identified VMs in the master catalog. For example, the VM identification module 302 may search the hard drive of the host computer 102 and may auto-discover four different, unique VMs, (e.g., VM1-VM4), stored on a local hard drive. VM1 may be, for example, Windows XP with Office XP; VM2 may be, for example, Windows 2000 with SQL 2000 and SharePoint Server 2003; VM3 may be, for example, Windows 2003 with Exchange 2003; and VM4 may be, for example, Red Hat Linux with Apache. Once discovered, the VM identification module 302 update the master catalog to include VM1-VM4 and may display an icon at the host computer 102 corresponding to VM1-VM4.

In 406, the grouping module 304 may permit the user to group VMs into one or more virtual infrastructures. For example, the user may create and save a virtual infrastructure having three VMs corresponding to a project on which the user is working. The grouping module 304 also may permit the user to give the virtual structure a name. The user may select VM1, VM2 and VM3, and may assign VM1-VM3 to a VM set. The grouping module 304 may allow the user to allocate the necessary resources to the virtual infrastructure for running the VMs as a group (e.g., allocating resources such as RAM, etc.).

In 408, the virtual networking module 306 may virtually network VM1-VM3 so that they may communicate with each other. The virtual networking module 306 also may set up a virtual network to permit VM1-VM3 of the VM set to communicate with VMs that are not a part of the VM set (e.g., VM4). The virtual networking module 306 also may change the virtual network settings to connect VM1-VM3 to a unique network. The virtual networking module 306 may assign the subnet, gateway, IP address, combinations thereof, and/or other information to create the unique network for the virtual infrastructure. Once the virtual infrastructure is created, a user interface associated with the VICC module 208 may display the VMs within the virtual infrastructure through a mechanism such as an expandable/collapsible menu structure.

In 410, the retirement module 308 may retire the virtual infrastructure after the user may decide that the virtual infrastructure is no longer necessary. For example, the user may complete a project associated with the virtual infrastructure and may longer use the virtual infrastructure. The user may decide that the resources of the host computer 102 may be used for a new project on which the user is working. Also, an administrator may instruct the retirement module 308 of one or more host computers 102 to retire one or more VMs and/or virtual infrastructures.

To retire the virtual infrastructure, the retirement module 308 may process the virtual infrastructure for storage. For example, the retirement module 308 may compress the VMs associated with the virtual infrastructure, may forward the compressed VMs to the remote storage device 108, and may delete the virtual infrastructure from the host computer 102. In other exemplary embodiments, the retirement module 308 may compress the virtual infrastructure and may locally store the compressed virtual infrastructure. The retirement module 308 may maintain archive information identifying the virtual infrastructure and the location at which the archived virtual infrastructure is stored (e.g., a storage address within the remote storage location 108, a memory location of the disk drive of the host computer 102, etc.). The flow diagram 400 may end at 412.

Creating VMs and discovering available VMs may be preparatory steps to a purpose of VMs, which is their deployment and use. Exemplary embodiments of the VMDA module 208 provide for a simple deployment of VMs to the host computer 102.

Exemplary VMDA Architecture

Figure 5:
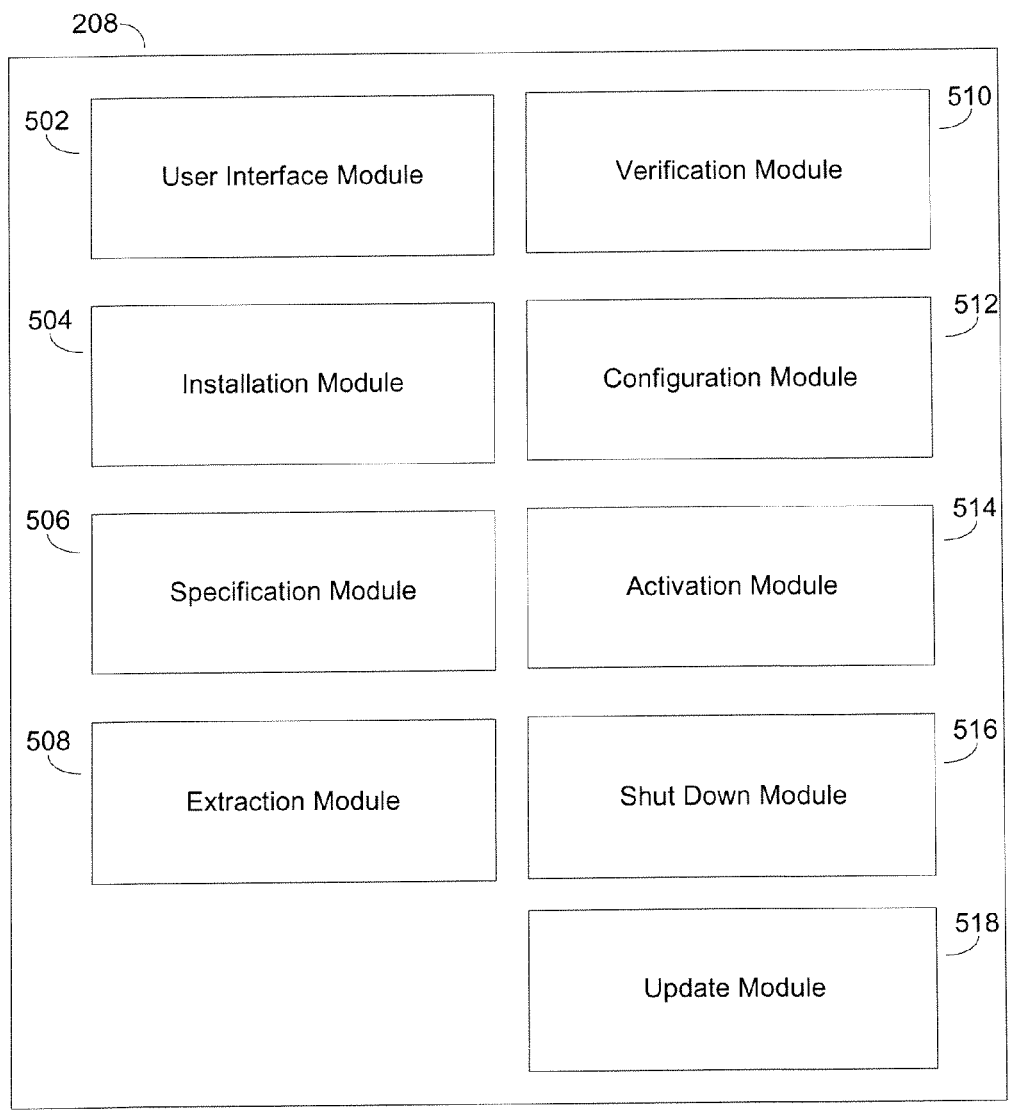
FIG. 5 illustrates exemplary architecture of a virtual machine deployment application module.

FIG. 5 illustrates exemplary architecture of the VMDA module 208. The VMDA module 208 may locally deploy a VM on the host computer 102, for example. Also, the VMDA module 208 of the host computer 102 may deploy a VM remotely to the remote computer 110 and/or one or more other remote computers over the network 106. For example, a network administrator at the host computer 102 may deploy a VM to multiple remote computers via the network 106. Additionally, the VMDA module 208 may run on a web server (not shown) and may deploy a VM to the host computer 102 from the web server, for example. Thus, the VMDA module 208 may be implemented at various locations and may locally or remotely deploy a VM to one or more devices.

In an exemplary embodiment, the VMDA module 208 may include a user interface module 502, an installation module 504, a specification module 506, an extraction module 508, a verification module 510, a configuration module 512, an activation module 514, a shut down module 516, and an update module 518.

Figure 6:
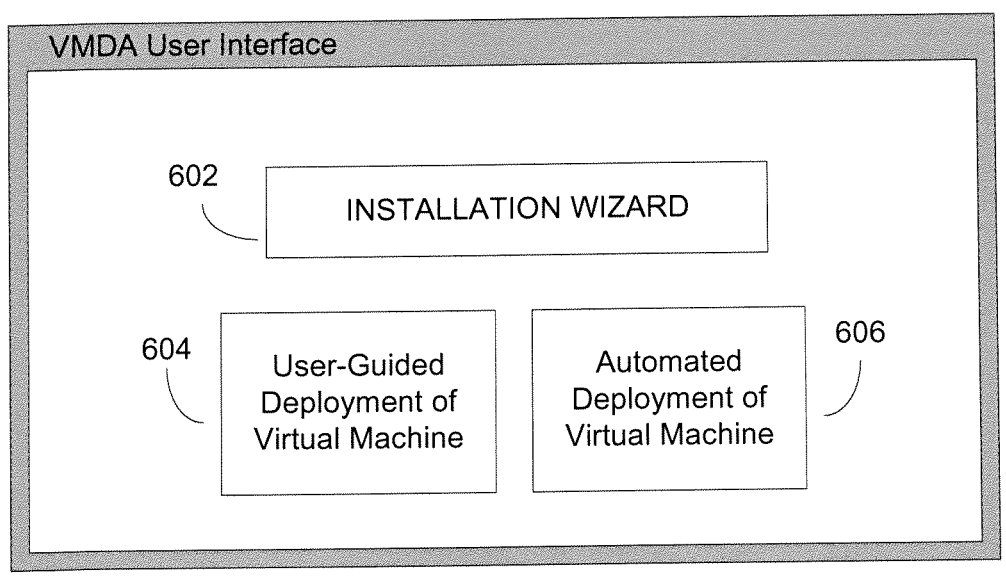
FIG. 6 illustrates an exemplary embodiment of a virtual machine deployment application user interface.

The user interface module 502 may present a VMDA user interface to a user of the host computer 102 after, for example, a user selects an icon or a user inserts a storage media. FIG. 6 illustrates an exemplary embodiment of the VMDA user interface 600. The VMDA user interface 600 may advantageously minimize the amount of input required from a user to deploy a VM. The VMDA user interface 600 may permit a user to deploy and launch a VM from a storage media through a seamless, single action process in which a user with a properly equipped computer can perform all of the actions required with a single confirmation. With the VMDA module 208, a user may not need any specialized knowledge or expertise in VM technology, for example, in order to implement and use a VM on the host computer 102. The VMDA module 208 may automate, as required by the VM payload 200, other system specifications including, but not limited to, network configuration, resource management, and other technical configurations for VMs.

The VMDA user interface 600 may appear as a simple installation program, including, but not limited to, an installation "wizard." The VMDA user interface 600 may simplify the process of deploying a VM in a manner that may be transparent to the end user and may not require sophisticated input from a user, unless the end user decides to supply such input. At its simplest, the amount of user input only may include clicking a button beside the desired virtual machine or virtual infrastructure on the VMDA user interface 600. For example, the VMDA user interface 600 may display a welcome screen stating "Welcome to Virtual Labs in a Box" and may present the user with some basic options including, but not limited to, a selection for deploying one or more VMs stored on the storage media or available via the network 106, and a selection of either user-guided deployment 604 or automated deployment 606. The installation module 504 may be the logic implementing the installation wizard 602. The installation module 504 may receive a user selection of either the user-guided deployment 604 or the automated deployment 606.

If the user selects the automated deployment 604, the specification module 506 may identify the system specification information of the host computer 102 and may retrieve the VM settings 216 within the metadata 204 and/or VMDA data 202 of the VM payload 200. System specification information may be the information of the host computer 102 that corresponds to the VM settings 216. For example, if the VM settings 216 identify a minimum amount of memory, a minimum processor speed, and a peripheral device, etc., the system specification information may identify the memory, processor speed, and peripheral devices of the host computer 102.

Selection of the user-guided deployment 604 may permit the user to input advanced user direction when deploying a VM. The user-guided deployment 604 may permit the user to create user-defined settings that modify some or all of the VM settings 216 of the metadata 204 and/or VMDA data 202. After receiving a selection for the user-guided deployment 606, the VMDA user interface 600 may prompt the user to input various types of user-defined settings. The user-defined settings may be modifications to the VM settings 216 of the metadata 204 and/or VMDA data 202 (e.g., allocate more or less RAM to the VM, etc.). The user also may be prompted to select the location where the VM may be stored on the local and/or remote storage drives associated with host computer 102. The specification module 506 may instruct the user interface module 502 to display a warning or error message indicating that the user-defined settings do not meet optimal and/or minimal resource requirements of the VM defined in the VM settings 216. The user may then select whether to permit deployment of the VM based on the possible substandard performance. Regardless of whether a given end user selects automated deployment 604 or user-guided deployment 606, the VMDA module 208 may perform many of the steps associated with VM deployment.

After collecting the system specification information from the host computer 102, the specification module 506 may generate validation information based on the host computer's 102 compliance with one or more of the VM settings 216 and/or with one or more of the user defined settings. To generate the validation information, the specification module 506 may compare the system specification information of the host computer 102 with the VM settings 216 and/or user defined settings to verify that the host computer 102 contains adequate resources to support running the VM. For example, the specification module 506 may compare the specification information of the host computer 102 with the VM settings 216, such as, but not limited to, disk drive space, system memory, RAM, processor speed, various processes of the host computer 102, sufficient user privileges, required software, combinations thereof, etc.

The specification module 506 also may verify that the virtualization module 212 may properly run the VM and/or may identify any errors or problems with the virtualization module 212 that may potentially affect running the VM on the host computer 102. The specification module 506 also may identify any problems and/or errors with the various components of the host computer 102 that may affect running the VM on the host computer 102.

After the validation of the host computer 102 and/or identification of any problems, the specification module 506 may determine whether to permit the extraction module 508 to copy one or more of the VM archives 206A-C associated with the VM to the host computer 102. If the host computer 102 may not properly deploy the VM, the specification module 506 may instruct the user interface module 502 to display an error message indicating that the host computer 102 may provide substandard performance of the VM or that the VM may not be deployed on the host computer 102. For example, the user interface module 502 may display a message indicating that the host computer 102 does not include sufficient RAM to properly run the VM, and the specification module 506 may not permit deployment of the VM. In other exemplary embodiments, the user may select to deploy the VM and accept possible substandard performance of the VM.

If permitted by the specification module 506 or by the user, for example, the extraction module 508 may then copy the one or more VM archives 206A-C of the VM payload 200 to a disk drive of the host computer 102. In an exemplary embodiment, a user may identify a target location on the host computer 102 for the copied VM archive 206, or the VM settings 216 may specify the target location. The extraction module 508 also may copy VM archive 206 from one or more other locations, such as, but not limited to, from a remote storage device 108 across the network 106, etc., to a local hard disk of the host computer 102.

Once copied to the host computer 102, the extraction module 508 may process the VM archive 206 to extract a VM file. In an exemplary embodiment, the VM archive 206 may store the VM in a processed state on the storage media, and the extraction module 508 may perform processing, such as, but not limited to, decryption, decompression, and/or other types of data processing, on the VM archive 206 to extract a VM file associated with a VM. Once processed, the extraction module 508 may remove the copied VM archive 206 from the host computer 102.

During processing, the extraction module 508 may instruct the user interface module 502 to display various messages at the VMDA User Interface 600. For example, the VMDA User Interface 600 may display "Processing VM X of X," "Time Remaining=XX mins," "Completing Processing," etc., combinations thereof, and/or other types of status messages. In an exemplary embodiment, these messages may correspond to the functions performed by the extraction module 508.

Once the extraction module 508 has completed processing the VM archive 206, the verification module 510 may validate the VM file. For example, the verification module 510 may examine the VM file to determine whether the extraction module 508 has properly decompressed, decrypted, combinations thereof, and/or otherwise properly processed the VM archive 206. If the verification module 510 determines that the VM file has not been properly processed, then the verification module 510 may instruct the user interface module 502 to display an error message and halt deployment of the VM, or the verification module 510 may instruct the installation module 504 to recopy the VM Archive 206 from the storage media and instruct the extraction module 508 to extract a new copy of the VM file from the VM Archive 206.

After the verification module 510 determines that the VM archive 206 has been properly processed, the configuration module 510 may find and configure the virtualization module 212 to list a new VM associated with the VM file. In an exemplary embodiment, the configuration module 510 may instruct the virtualization module 212 to add the new VM and may instruct the VICC module 210, for example, to add the new VM to the master catalog. If the host computer 102 includes multiple virtualization modules 212, the VM settings 216 may define a preferred virtualization module 212 for adding the new VM, and in other exemplary embodiments, the user may select one or more of the virtualization modules 212.

In an exemplary embodiment, when adding a new VM, the virtualization module 212 may create a folder and create VM hard disk files that may contain every byte of data of the VM. The virtualization module 212 may use the VM hard disk files in differencing disks, and/or checkpointing, for example. Differencing disks may identify changes between the VM as installed and the saved changed to the VM. The VMs may contain disk hierarchy or may have a disk hierarchy file. Disk hierarchy may refer to adding binary files that contain additional information about the state of the deployed VM to the initial VM hard disk file. The binary files may include the addition of new programs or any updates/changes made to the host computer 102. The virtualization module 212 may use the VM hard disk files to identify: disk drives associated with the VM, network interfaces, Small Computer System Interface (SCSI) controllers, amount of memory, etc., other components of the host computer 102 that may be used by the VM, and/or combinations thereof.

In an exemplary embodiment, the VM hard disk files may include a virtual hard disk file (e.g., VHD, VMDK, etc.) and virtual machine configuration file (e.g., VMC, VMX, etc.) (e.g., SERVER.vmc and SERVER.vhd; SERVER.vmx and SERVER.vmdk) for the new VM. The VHD files may be one of various formats, such as Dynamically Expanding Virtual Hard Disk, Fixed Size Virtual Hard Disk, Differencing Virtual Hard Disk, Linked Virtual Hard Disk Virtual hard disk file, and/or other suitable formats, for example. Once the virtualization module 212 has added the new VM, the user may activate and run the new VM on the host computer 102.

To activate the VM, the activation module 514 may receive a user selection requesting activation of one or more VMs and/or a virtual infrastructure. For example, once the VM is deployed on the host computer 102, the user interface module 502 may display an icon associated with the VM. The user may select the icon to activate the VM by clicking on the icon, for example. The activation module 514 may then activate the VM and the VM may display a VM interface for interacting with the user.

Exemplary VMDA Process

Figure 7A:
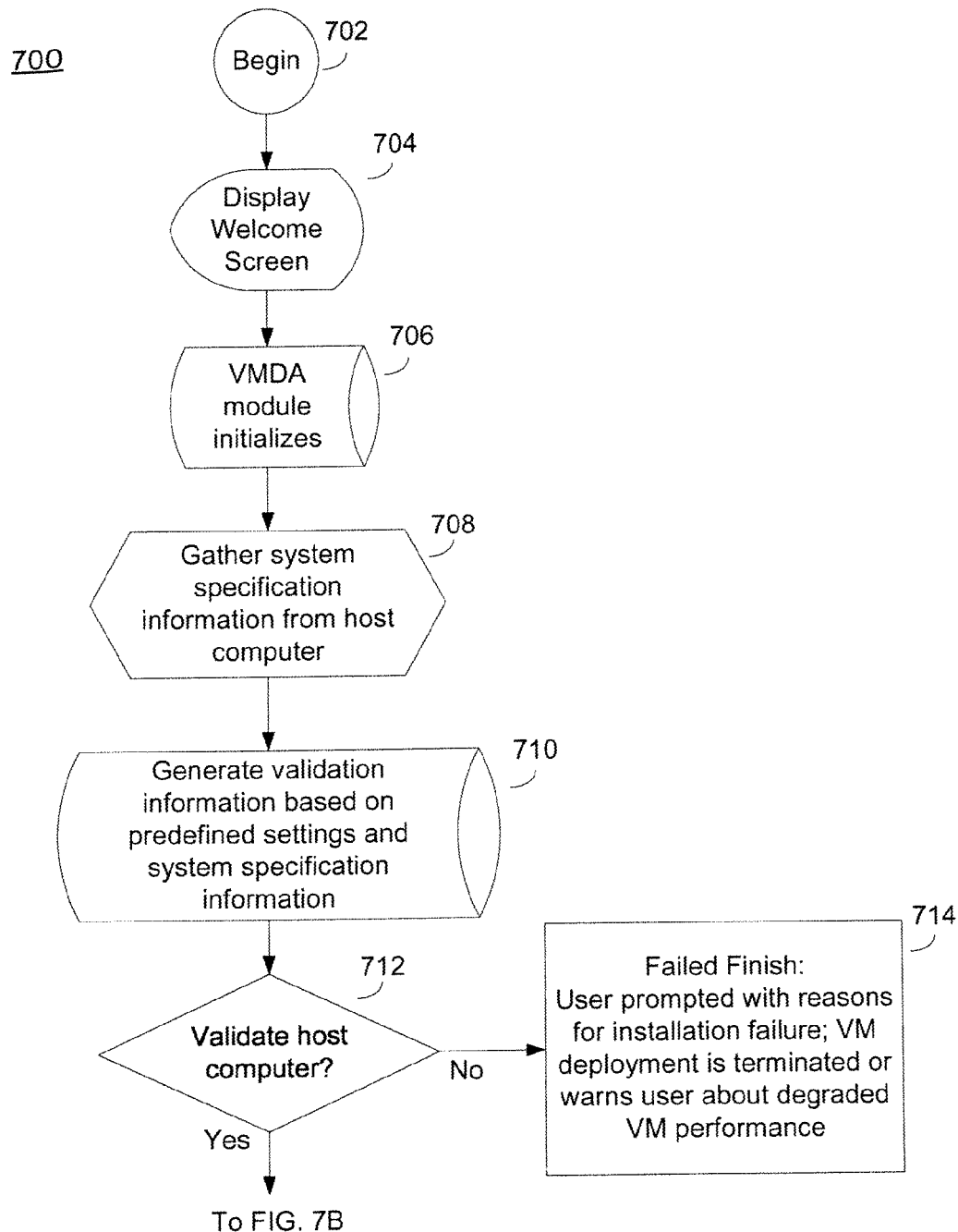
FIGS. 7A-B illustrate an exemplary flow diagram of a virtual machine deployment application module deploying a virtual machine on a host computer.
Figure 7B:
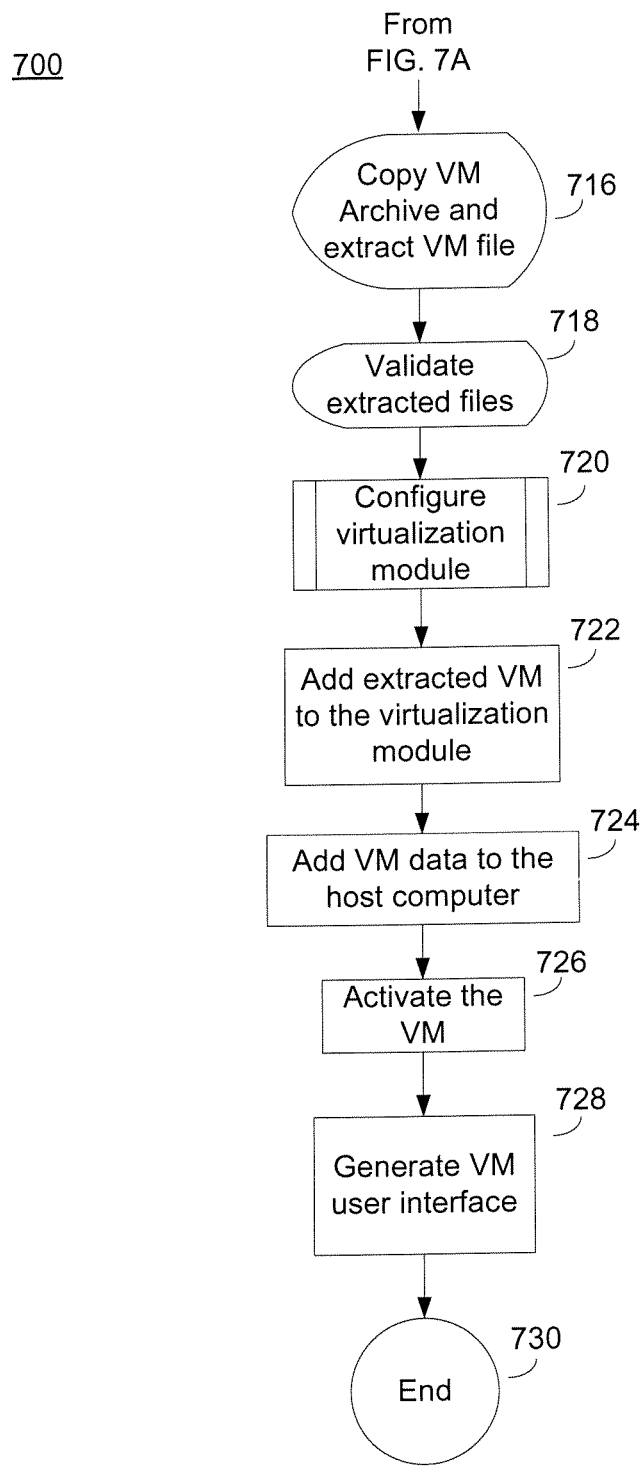

FIG. 7 illustrates an exemplary flow diagram 700 of the VMDA module 208 deploying a VM on the host computer 102. It is noted that the VMDA module 208 also may work on the permutations of the use case scenarios discussed herein, deploying, for example, a single virtual machine from a single medium, device, or location; multiple virtual machines from a single medium, device, or location; a single virtual machine from multiple media, devices, or locations; multiple virtual machines from multiple media, devices, or locations; combinations thereof, and/or in other manners. The flow diagram 700 may begin at 702 and may continue to 704.

In 704, a user may insert a storage media into the local storage device 104, the VMDA module 208 may instruct the user interface module 502 to display a welcome screen, and the VMDA module 208 may read the VM payload 200 from the storage media to retrieve the VMDA data 202, the metadata 204, and to identify one or more VM archives 206. In other exemplary embodiments, the VMDA module 208 may instruct the VMDA user interface 600 to display a message requesting that the user identify a VM for deployment on the host computer 102 and a location of the VM (e.g., on the local storage device 104, on the remote storage device 108, etc.).

In 706, the VMDA module 208 may be initialized. Initialization may involve logging a time and a date and reporting the time and date to a remote server via a web service. After initialization, the installation module 502 may instruct the user interface module 502 to display a message instructing the user select one or more VM archives 206 for deployment, and either an automated deployment 606 or a user-guided deployment 604. The installation module 504 may then receive the user input and may begin deploying the selected VM. For example, the installation module 504 may receive a user selection for automated deployment of the VM in accordance with the VM settings 216. Also, the installation module 504 may receive a user selection for deployment of the VM according to user defined settings or combinations of VM settings 216 and user settings.

In 708, the specification module 506 may gather system specification information from the host computer 102. For example, the specification module 506 may identify the amount of RAM, free disk drive space, network connections, existing virtualization platform, (e.g., identify one or more installed virtualization modules 212), etc., of the host computer 102, and the privileges of the user. The specification module 506 also may write user computer data to a log file and may report the log file to a log server (not shown) via a web service. For example, the log file may report the flow of activities chronologically, such as a start time of the VM, a check of the host computer 102, whether the VM may be deployed on the host computer 102, etc., to the log server. Both fatal and minor exceptions may be recorded with a brief message and a stack trace. Pertinent information about the host computer 102 may be conveyed, such as, but not limited to, total system memory, total disk space, memory available, disk space available, other virtual machines operating on the host computer 102, and/or combinations thereof. The VMDA module 208 may forward a log request including the log file to the log server and may receive from the log server a success response indicating that the log server has received the log file. If the success response is not received, the VMDA module 208 may queue the log request for resubmission at a later time.

In 710, the specification module 506 may generate validation information for the host computer 102 based on the VM settings 216 and/or user defined settings and the system specification information. The validation information may indicate whether the system specification information satisfies the VM settings 216. In exemplary embodiments, the specification module may compare the user defined settings and/or the VM settings 216 to the system specification information.

In 712, the specification module 506 may determine whether the system specification information satisfies the VM settings 216 and/or user defined settings to properly operate the VM. If the system specification information is insufficient, then the specification module 506 may not validate the host computer 102 and the flow diagram 700 may continue to 714. If the system specification information is sufficient, then the specification module 506 may validate the host computer 102 and flow diagram 700 may continue to 716.

In 714, the specification module 506 may instruct the user interface module 502 to display a message indicating that the VM cannot be properly deployed on the host computer 102. In an exemplary embodiment, the message may identify which VM setting the host computer 102 does not satisfy (e.g., insufficient RAM, insufficient user privileges, does not include necessary peripheral device, etc.). Also, the message may warn the user about possible degraded performance of the VM and may request the user to accept possible substandard performance of the VM on the host computer 102. The flow diagram 700 may end if the user does not accept the substandard performance or if the VM setting does not permit deployment on a substandard computer, or in other exemplary embodiments, may continue to 716 if the user accepts the possible substandard performance of the VM on the host computer 102.

In 716, the extraction module 508 may copy the VM archive 206 of the VM payload 200 from the storage media and may extract a VM file. For example, the extraction module 508 may copy the VM archive 206 and may process (e.g., decompress, decrypt, etc.) the VM archive 206 to obtain a VM file. The extraction module 508 also may instruct the user interface module 502 to display various messages indicative of the status of copying the VM archive 206 and extracting the VM file. In various exemplary embodiments, the extraction module 508 may permit the user to stop deployment of the VM after the extraction module 508 has begun extracting the VM archive 206. For example, once the user has selected to stop deployment, the extraction module 508 may delete any copied and/or processed VM data stored on the host computer 102.

In 718, the verification module 510 may verify that the extraction module 508 properly generated a VM file based on the VM archive 206. The extraction module 508 may verify a checksum value of the VM archive 206 in a verification routine to check the integrity of the VM file, for example.

In 720, the configuration module 512 may configure the virtualization module 212. For example, configuring may involve alteration or conversion of the VM file to suit the host computer 102 and/or modification of the VM file to modify the VM.

In 722, the configuration module 512 may add the VM to the virtualization module 212. For multiples virtualization modules 212, the VM settings 216 may identify to which virtualization module 212 the extracted VM is added. Also, the user may specify to which virtualization module 212 the extracted VM is added.

In 724, the configuration module 512 may record user-side VM data at the host computer 102. The user-side VM data may record information on what occurs at the host computer 102 during deployment. The user-side VM data may be a time stamp associated with an action, and a result. For example, the user-side VM data may indicate that at a specific time a VM was successfully deployed at a particular IP address.

In 726, the activation module 512 may receive a user input (e.g., selection of an icon, etc.) requesting activation of the VM. Also, the activation module 512 may automatically activate the VM once the VM is deployed.

In 728, the activation module 512 may activate the VM and may connect the user to a VM user interface. Through the VM user interface, the user may use the VM. For example, the activation module 512 may open a user interface, such as, but not limited to, a Virtual Server Administration Website. (VS admin VSMT), for running the deployed VM. In an various exemplary embodiments, the deployed VMs may run inside of the VMDA user interface 600, which may eliminate the need of users to use the VMDA module 208 to access virtual machines. The activation module 512 also may record the time and date of VM activation for reporting to a remote server via a web service. The time and date may be used to validate a license for the VM and/or to detect piracy of the VM. For example, the time and date of VM activation may be used to determine that the number of instances of the VM is greater than the number of licenses sold, and hence that the VM is being pirated. The flow diagram 700 may continue to 730 and end.

Figure 8:
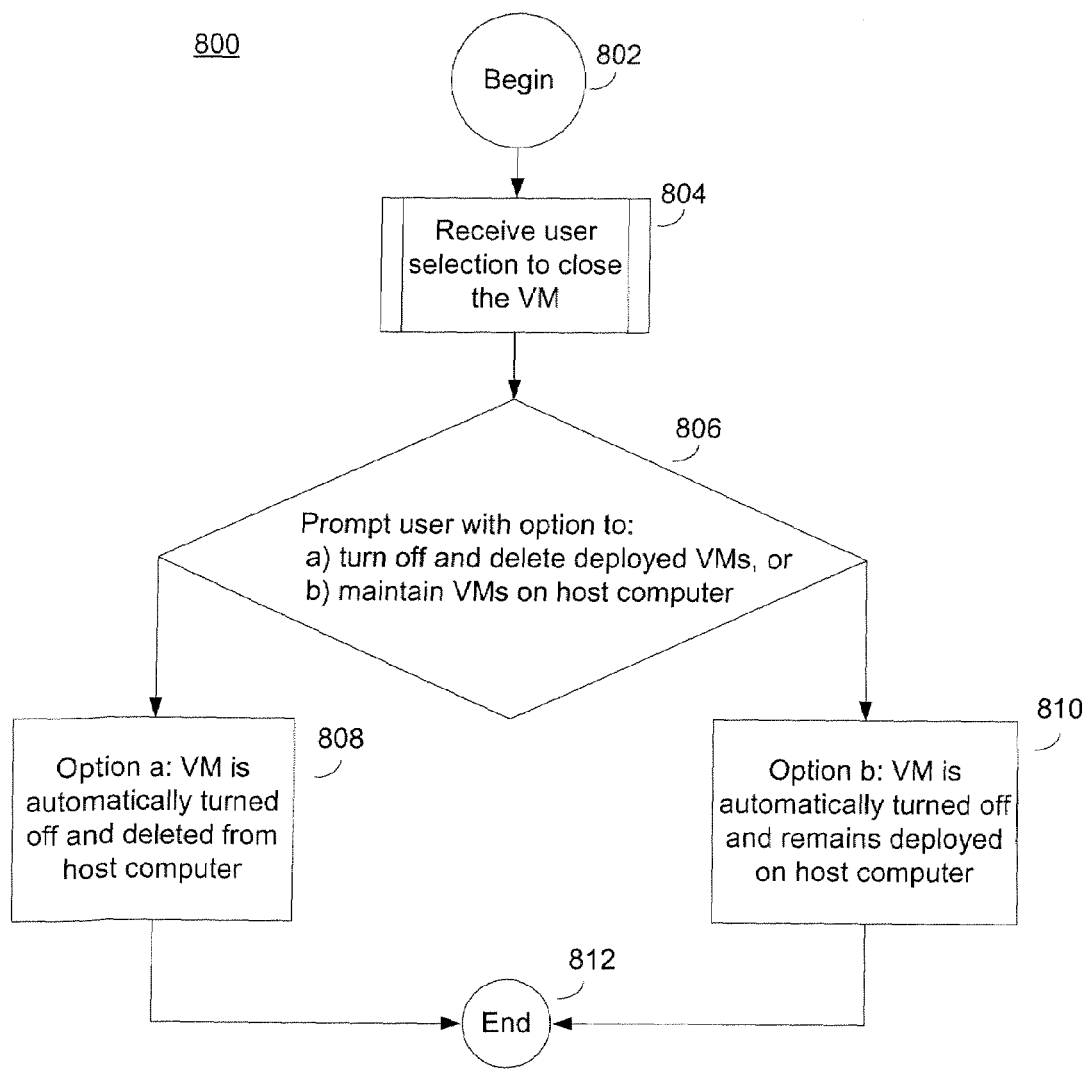
FIG. 8 illustrates an exemplary embodiment of a flow diagram of a virtual machine deployment application module closing a virtual machine deployed on a host computer.

FIG. 8 illustrates an exemplary embodiment of a flow diagram 800 of the VMDA module 210 closing a VM deployed on the host computer 102. The flow diagram 800 may begin at 802 and continue to 804.

In 804, the shut down module 516 may receive an input from the user at the host computer 102 requesting to close a VM. Closing a single VM is described below; however, the same process may be used to close one or more VMs, or to close a virtual infrastructure. Multiple VMs may be closed simultaneously, concurrently, or sequentially.

In 806, the shut down module 516 may instruct the user interface module 502 to display a message prompt. In an exemplary embodiment, the message prompt may request whether the user wishes to delete the deployed VM from the host computer 102, or to leave the VM deployed on the host computer 102. If the user selects to remove the VM deployed from the host computer 102, the flow diagram 800 may then continue to 808. If the user selects to leave the VM deployed on the host computer 102, the flow diagram 800 may then continue to 810.

In 808, the shut down module 516 may automatically close the VM and may delete the VM from the host computer 102. By selecting this option, the VM may no longer be deployed on the host computer 102. The shut down module 516 also may free up any resources of the host computer 102 allocated to the VM. If the user desires to use the VM at a later time, the VMDA module 208 must re-deploy the VM from the storage media. The flow diagram 800 may then end at 812.

In 810, the shut down module 516 may close the VM without deleting the VM from the host computer 102. The shut down module 516 also may free up any resources of the host computer 102 allocated to the VM. By selecting this option, the VM may remain deployed on the host computer 102. If the user desires to use the VM, the activation module 514 may receive an input from the user requesting activation of the VM and the activation module 514 may reactivate the VM, as discussed above. The flow diagram 800 may then end at 812.

Updating of Deployed VMs

Figure 9:
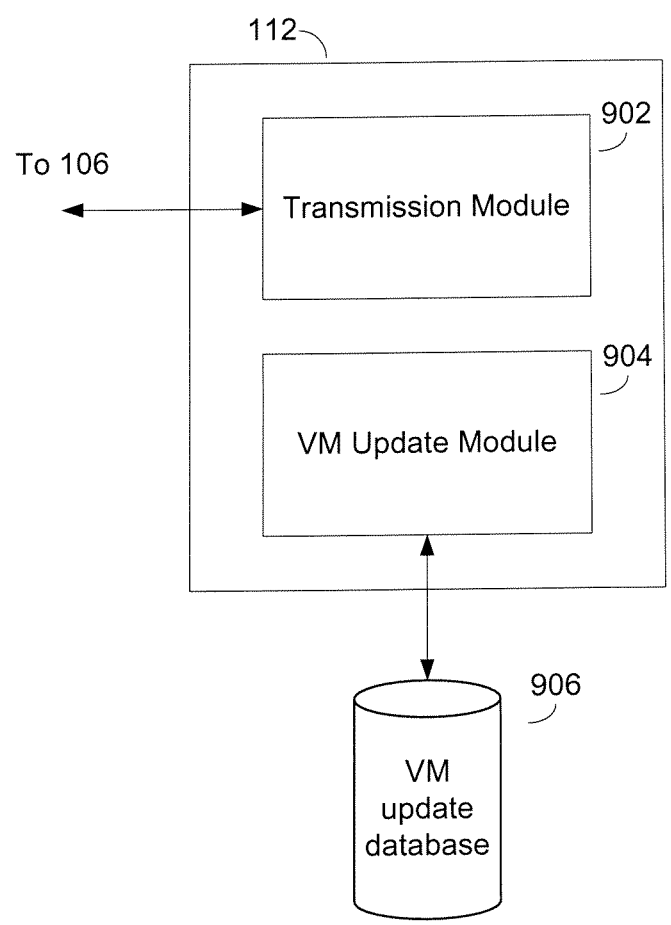
FIG. 9 illustrates an exemplary embodiment of a Virtual Machine Update Service server for updating a virtual machine deployed on a host computer.

FIG. 9 illustrates an exemplary embodiment of the Virtual Machine Update Service (VMUS) server 112 for updating a VM deployed on the host computer 102. In addition to creating, deploying, and managing a VM, the VM module 114 may interact with the VMUS server 112 to update previously deployed VMs. The VMUS server 112 may permit an efficient methodology for providing multiple updates to a single VM, multiple updates corresponding to respective VMs, multiple updates each associated with multiple VMs, and/or combinations and other permutations thereof. VMs may have unique characteristics because they may only use one or a few standard VM file(s) that act as an operating system for the VM. In an exemplary embodiment, to efficiently update a previously deployed VM, the VMDA module 208 may receive a VM update and may create a new unique VM based on the VM update and the previously deployed VM.

Implementing a new VM based on a VM update and a previously deployed VM may provide various advantages over conventional solutions. First, adding a VM update to a previously deployed VM may enable organizations and/or VM developers to provide a unique application to run in a VM without requiring the host computer 102 to delete the previous VM, and then install a new VM incorporating the VM update. Second, the VM update mechanism described herein may add new features to the previously deployed VM. Third, the VM update mechanism described herein may be used to add security updates to a previously deployed VM.

In an exemplary embodiment, the VMUS server 112 may include a transmission module 902, a VM update module 904, and a VM update database 906. The transmission module 902 may be coupled to the network 106 and may control data communications between the VMUS server 112 and the host computer 102. The VM update database 906 may store one or more updates associated with one or more VMs. The VM update module 904 may store and may retrieve VM update information corresponding to the VM updates in the VM update database 906. The VM update module 904 may receive VM updates from VM developers, may process requests from the host computer 102 requesting one or more VM updates, and may instruct the transmission module 902 to transmit VM updates to the host computer 102 corresponding to the VM update requests.

Exemplary VM Update Process

Figure 10A:
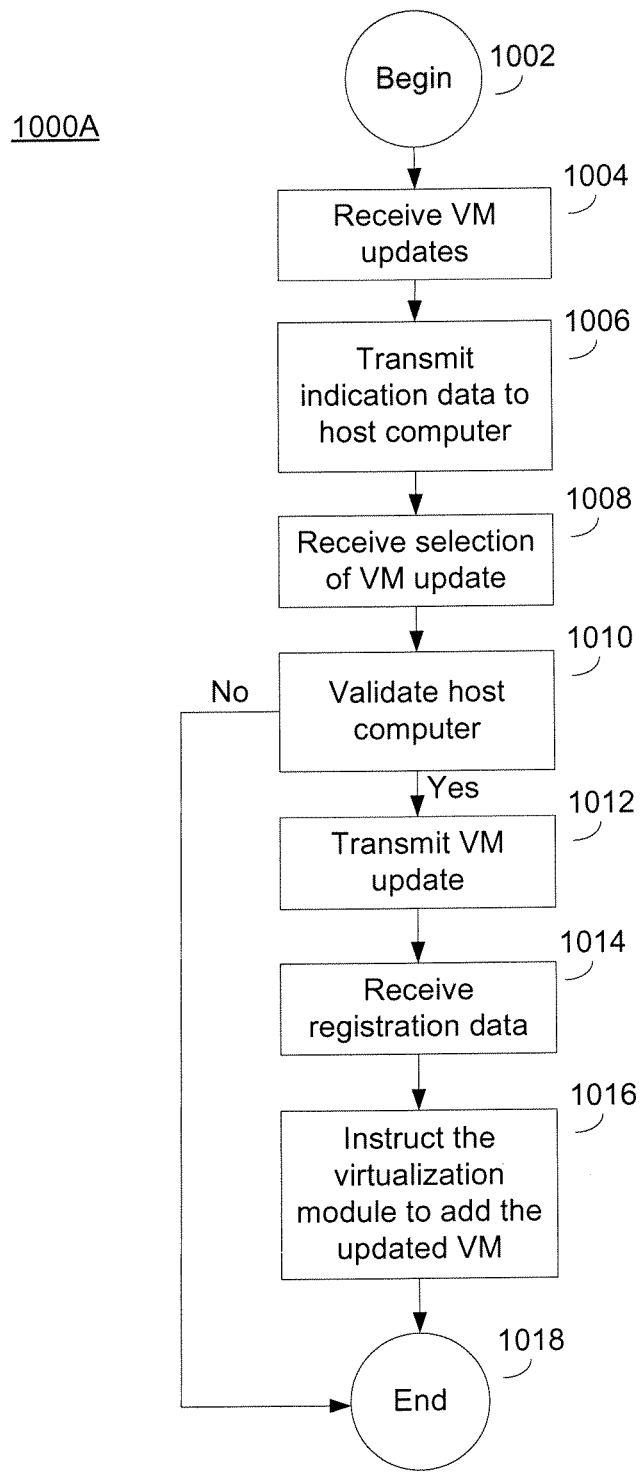
FIGS. 10A-10B illustrate an exemplary embodiment of flow diagrams for updating a virtual machine deployed on a host computer.
Figure 10B:
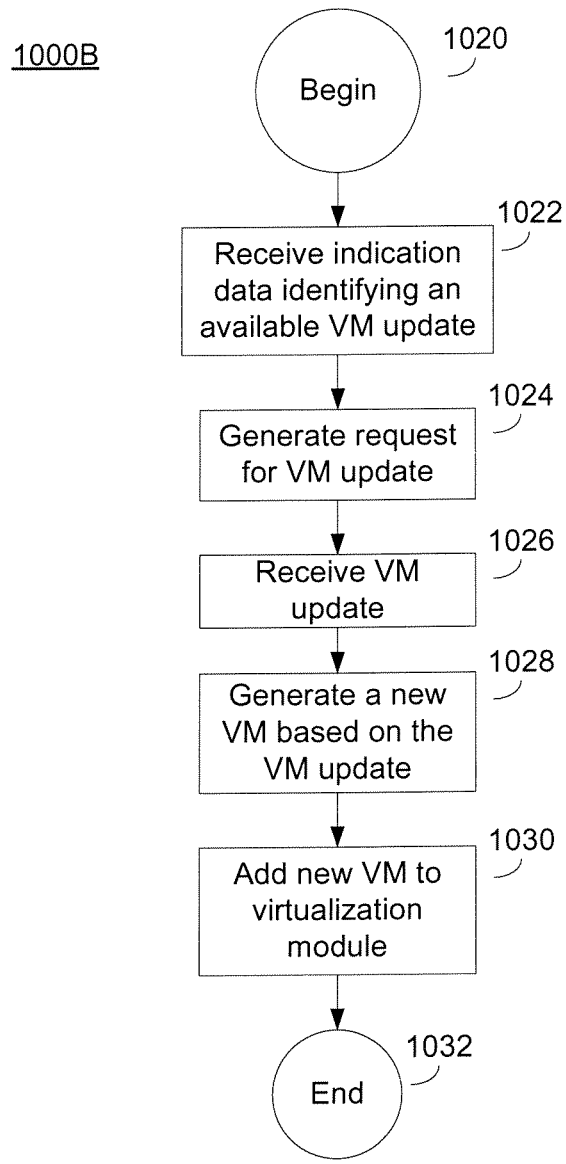

FIGS. 10A-10B illustrate flow diagrams 1000A and 1000B for updating a VM deployed on the host computer 102. The flow diagram 1000A may correspond to processes that occur at the VMUS server 112, and the flow diagram 1000B may correspond to the processes that occur at the host computer 102. The flow diagram 1000A may begin at 1002 and may then continue to 1004.

In 1004, the transmission module 902 of the VMUS server 112 may receive one or more VM updates for one or more VMs provided by a VM developer, for example. The transmission module 902 may communicate the VM updates to the VM update module 904 for storage in the VM update database 906.

In 1006, the VM update module 904 may identify any computers associated with the VM update and may instruct the transmission module 902 to transmit indication data to the identified computers indicating that one or more VM updates for the deployed VM are available. The indication data may be in the form of a Web page, a client application, combinations thereof, and/or other types of data for indicating an update for a VM is available. The VM update also may be provided to the user via a storage media (e.g., CD, DVD, etc.).

In an exemplary embodiment, the VM update module 904 may identify that the host computer 102 has deployed the VM associated with the VM update, and may instruct the transmission module 902 to transmit indication data to the host computer 102 indicating that a VM update for the deployed VM is available.

In 1008, the transmission module 902 may receive a request for one or more VM updates from the host computer 102. The request also may include the system specification information of the host computer 102.

In 1010, the VM update module 904 may validate the host computer 102 based on the host computer's 102 ability to execute a new VM based on the previously deployed VM and one or more requested VM updates. The VM update module 904 may validate the host computer 102 to ensure that the VM update, when added to the previously deployed VM, may properly function on the host computer 102.

In various exemplary embodiments, the VM update module 904 may compare the system specification information of the host computer 102 with the VM settings 216 required by the VM update to determine whether a new VM, based on the previously deployed VM and the VM update, may properly function on the host computer 102. Also, the VMDA module 208 may validate the host computer 102 to ensure that the new VM may properly function on the host computer 102, and then the VMDA module 208 may forward confirmation that the host computer 102 may properly run the new VM. If the host computer 102 is not validated, the VM update module 904 may instruct the transmission module 902 to transmit an error message stating that the VM update cannot be deployed and may proceed to 1018 and end. In other exemplary embodiments, the error message may state that adding the VM update to the previously deployed VM may degrade the performance of a new VM, and permit the user to determine whether to add the VM update. If the host computer 102 is validated or the user selects to add the VM update even with the possibility of degraded VM performance, the flow diagram 1000A may then continue to 1012.

In 1012, the VM update module 904 may retrieve the VM update from the VM update database 906 and may instruct the transmission module 902 to transmit the VM update to the host computer 102.

In 1014, the transmission module 902 may receive registration data from the host computer 102. The registration data may identify that the host computer 102 successfully received the VM update. The VM update module 904 may use the registration data to track which VM updates have been provided to the host computer 102.

In 1016, the VM update module 904 may instruct the transmission module 902 to forward configuration instructions to the configuration module 512 for configuring a new VM based on the previously deployed VM and the VM update, and for adding the new VM to the virtualization module 212. In various other embodiments, the update module 518 may receive the VM update and forward the configuration instructions to the configuration module 512. The flow diagram 1000A may end at 1018.

The flow diagram 1000B may correspond to the processes performed by the VMDA module 208 of the host computer 102 corresponding to the processes performed by the VMUS server 112. The flow diagram 1000B may begin at 1020 and may continue to 1022.

In 1022, the update module 518 of the VMDA module 208 may receive indication data from the VMUS server 122 indicating that a VM update is available for a VM deployed on the host computer 102. The update module 518 may instruct the user interface module 502 to display a message to a user stating that an update is available for a deployed VM.

In 1024, the update module 518 may receive a user input requesting retrieval of the VM update. The update module 518 may then generate a request for the VM update to the VMUS server 112. The update module 518 also may query the specification module 506 for system specification information of the host computer 102 and may include the system specification information in the request. In other exemplary embodiments, the update module 518 may automatically request the VM update without user intervention upon receipt of the indication data.

In 1026, the update module 518 may receive the VM update, and the update module 518 may transit registration data to the VM update module 904 indicating receipt of the VM update. The update module 518 may then receive information from the VMUS server 112. The update module 518 may forward the configuration information and the VM update to the configuration module 512. Also, the update module 518 may receive the VM update and the configuration information, and then may transmit registration data to the VM update module 904.

In 1028, the configuration module 512 may generate a new VM based on the previously deployed VM and the VM update. The configuration module 512 may merge the VM file of the deployed VM with the VM update into a file set. The virtualization module 212 may use disk hierarchy features on the file set.

In 1030, the configuration module 512 may register the new VM with the virtualization module 212 and the VICC module 210. In an exemplary embodiment, the configuration module 512 may make the new VM known and usable to the virtualization module 212, and also may enter the VM settings 216 for the VM into the virtualization module 212 and into the VICC module 210 (e.g., but not limited to, RAM, network connections, shut-down options, etc.). The flow diagram 1000B may end at 1032.

As described above, the VMDA module may simplify deploying, running, and updating VMs on a host computer for those who are not familiar with VM technologies and may provide a simpler and hassle-free means for experienced VM technologists. Most visible to end users, the VMDA module may allow the end user to deploy virtual machines with as little direction as a single mouse click. The VMDA module and the VICC module may facilitate creation, discovery, management, deployment, and usage of virtual machines. The VMDA module and the VICC module may simplify each of these stages and open the effective use of virtual machines to a wider spectrum of knowledge workers.

The exemplary embodiments are not to be limited in scope by the specific embodiments described herein. For example, although many of the embodiments disclosed herein have been described with reference to systems and methods for Virtual Machines, the principles herein are equally applicable to other aspects of VM design and function. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. It is noted that various modules are described herein as performing certain functions. However, more or less modules may be used, and the functions of certain modules may be incorporated into other remote or local modules. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A computer-implemented method comprising:
receiving a selection from a user interface for a virtual machine to be deployed on a host computer;
identifying virtual machine settings associated with the virtual machine, wherein the virtual machine settings comprise (i) virtual machine computing requirements which are dependent on a number of virtual machines simultaneously running or anticipated to simultaneously run on the host computer, (ii) an order in which the number of virtual machines simultaneously running or anticipated to simultaneously run on the host computer are started when multiple virtual machines are simultaneously running or anticipated to be simultaneously running on the host computer, and (iii) user privileges for allowing the virtual machine to be deployed;
automatically obtaining system specification information associated with the host computer, wherein the host computer is a candidate to host the virtual machine and permit a user to deploy the virtual machine through a virtual machine user interface which allows the user to optionally modify at least one of the virtual machine settings;
automatically generating validation information based on the system specification information and the virtual machine settings, wherein generating the validation information comprises comparing the system specification information with the virtual machine settings to verify whether the host computer can support the virtual machine; and
automatically determining whether to deploy the virtual machine to the host computer based on the validation information and automatically deploying the virtual machine based on the validation information being satisfied.

2. The computer-implemented method of claim 1, further comprising:
copying a virtual machine archive to the host computer from a storage media; and
extracting a virtual machine file from the virtual machine archive.

3. The computer-implemented method of claim 2, wherein extracting comprises decompressing the virtual machine archive.

4. The computer-implemented method of claim 2, wherein extracting comprises decrypting the virtual machine archive.

5. The computer-implemented method of claim 2, further comprising:
configuring a virtualization module based on the virtual machine file.

6. The computer-implemented method of claim 5, further comprising:
instructing the virtualization module to add the virtual machine at the host computer.

7. The computer-implemented method of claim 6, further comprising:
receiving, at the host computer, a virtual machine update pertaining to the virtual machine to be deployed on the host computer; and
generating, using the host computer, a second virtual machine based on the virtual machine update and the virtual machine.

8. The computer-implemented method of claim 7, further comprising deploying the second virtual machine to the host computer.

9. The computer-implemented method of claim 5, further comprising:
activating the virtual machine on the host computer.

10. The computer-implemented method of claim 9, further comprising:
generating, using the host computer, a graphical user interface associated with the virtual machine.

11. The computer-implemented method of claim 9, further comprising:
closing the virtual machine.

12. The computer-implemented method of claim 11, further comprising:
deleting the virtual machine from the host computer.

13. The computer-implemented method of claim 1, further comprising:
receiving, at the host computer, a user input identifying a network storage location of a virtual machine archive.

14. The computer-implemented method of claim 1, wherein the virtual machine settings further comprise a minimum processor speed of the host computer.

15. The computer-implemented method of claim 1, wherein the virtual machine settings further comprise a minimum system memory of the host computer.

16. The computer-implemented method of claim 1, wherein the virtual machine settings further comprise information regarding a peripheral device associated with the host computer.

17. The computer-implemented method of claim 1, wherein the virtual machine settings further comprise a security setting of the host computer.

18. The computer-implemented method of claim 1, wherein the virtual machine settings further comprise a virtualization module of the host computer.

19. The computer-implemented method of claim 1, wherein the virtual machine settings further comprise information regarding a network device associated with the host computer.

20. The computer-implemented method of claim 1, further comprising:
writing host computer information to a log file, wherein the log file is reported to a log server via a web service.

21. The computer-implemented method of claim 20, wherein the order of starting the virtual machine and second virtual machine on the host computer is determined by attributes of a virtual network operating on the host computer.

22. The computer-implemented method of claim 1, wherein the virtual machine comprises an alternate version of an existing virtual machine.

23. A computer program stored on a non-transitory computer-readable storage media that when executed on a host computer causes the host computer to:
receive a selection via a user interface for a virtual machine to be deployed on a host computer;
identify virtual machine settings associated with the virtual machine, wherein the virtual machine settings comprise (i) virtual machine computing requirements which are dependent on a number of virtual machines simultaneously running or anticipated to simultaneously run on the host computer, (ii) an order in which the number of virtual machines simultaneously running or anticipated to simultaneously run on the host computer are started when multiple virtual machines are simultaneously running or anticipated to be simultaneously running on the host computer, and (iii) user privileges for allowing the virtual machine to be deployed;
automatically obtain system specification information associated with the host computer, wherein the host computer is configured to permit a user to use the virtual machine through a virtual machine user interface;
automatically generate validation information to identify the system specification information and obtain the virtual machine settings, wherein generating the validation information comprises comparing the system specification information with the virtual machine settings to verify whether the host computer can support the virtual machine;
automatically analyze the system specification information to ensure available disk space exists to deploy the virtual machine; and
automatically determine whether to deploy the virtual machine to the host computer based on the validation information and automatically deploying the virtual machine based on the validation information being satisfied.

24. The computer program stored on a non-transitory computer-readable storage media of claim 23, wherein the virtual machine comprises an alternate version of an existing virtual machine.

25. A system comprising:
a processor configured to execute a plurality of modules comprising:
an installation module at a host computer to receive a selection for a virtual machine to be deployed on a host computer;
a virtual machine deployment application module to receive virtual machine settings associated with the virtual machine, wherein the virtual machine settings comprise (i) virtual machine computing requirements which are dependent on a number of virtual machines simultaneously running or anticipated to simultaneously run on the host computer, (ii) an order in which the number of virtual machines simultaneously running or anticipated to simultaneously run on the host computer are started when multiple virtual machines are simultaneously running or anticipated to be simultaneously running on the host computer, and (iii) user privileges for allowing the virtual machine to be deployed; and
a specification module configured to utilize one or more computer processors of the host computer to:
automatically obtain system specification information associated with the host computer, wherein the host computer is a candidate to host the virtual machine and permit a user to use the virtual machine through a virtual machine user interface;
automatically generate validation information by comparing the system specification information with the virtual machine settings to verify whether the host computer can support the virtual machine;
automatically analyze the system specification information to ensure available disk space exists to deploy the virtual machine; and
automatically determine whether to deploy the virtual machine to the host computer based on the validation information and
automatically deploying the virtual machine based on the validation information being satisfied.

26. The system of claim 25, wherein the virtual machine comprises an alternate version of an existing virtual machine.

* * * * *